(12) United States Patent
Franceschini et al.

(10) Patent No.: US 9,256,371 B2
(45) Date of Patent: Feb. 9, 2016

(54) IMPLEMENTING REINFORCEMENT LEARNING BASED FLASH CONTROL

(71) Applicant: GLOBALFOUNDRIES Inc., Grand Cayman (KY)

(72) Inventors: Michele M. Franceschini, White Plains, NY (US); Hillery C. Hunter, Chappaqua, NY (US); Ashish Jagmohan, Irvington, NY (US); Janani Mukundan, Ithaca, NY (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 198 days.

(21) Appl. No.: 13/903,182

(22) Filed: May 28, 2013

(65) Prior Publication Data

US 2014/0359197 A1 Dec. 4, 2014

(51) Int. Cl.
*G06F 12/00* (2006.01)
*G06F 3/06* (2006.01)

(52) U.S. Cl.
CPC ............ *G06F 3/0613* (2013.01); *G06F 3/0614* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,978,342 B1 | 12/2005 | Estakhri et al. | |
| 7,340,581 B2 | 3/2008 | Gorobets et al. | |
| 7,441,090 B2 | 10/2008 | Estakhri et al. | |
| 7,450,420 B2 | 11/2008 | Sinclair et al. | |
| 2004/0073764 A1 | 4/2004 | Andreasson | |
| 2007/0061506 A1* | 3/2007 | Liang et al. | 711/103 |
| 2010/0179930 A1 | 7/2010 | Teller et al. | |
| 2012/0102263 A1 | 4/2012 | Aswadhati | |
| 2012/0239991 A1 | 9/2012 | Melik-Martirosian | |

FOREIGN PATENT DOCUMENTS

| | | |
|---|---|---|
| CN | 102525795 A | 7/2012 |
| DE | WO 0186610 A1 | 11/2001 |
| WO | WO2004012106 A1 | 2/2004 |

OTHER PUBLICATIONS

Kudlur, M et al; "FLASH: Foresighted latency-aware scheduling heuristic for processors with customized datapaths"; In Proc. of the 2004 International Symposium on Code Generation and Optimization (Mar. 2004), pp. 201-212.

(Continued)

*Primary Examiner* — Daniel Tsui
(74) *Attorney, Agent, or Firm* — Heslin Rothenberg Farley & Mesiti P.C.

(57) ABSTRACT

A method and system are provided for implementing enhanced flash storage control using reinforcement learning to provide enhanced performance metrics. A flash controller, such as a Reinforcement Learning (RL) flash controller, is coupled to a flash storage. The flash controller defines a feature set of flash parameters determined by a predefined one of a plurality of optimization metrics. The optimization metric is adapted dynamically based upon system workload and system state. The flash controller employing the feature set including at least one feature responsive to erase operations; computes a current system state responsive to the employed feature set; selects actions at each time step by sensing the computed current system state for performing an action to maximize a long term reward, and moves to another state in the system while obtaining a short-term reward for the performed action.

16 Claims, 7 Drawing Sheets

(56) References Cited

OTHER PUBLICATIONS

Carlos D. Paternina-Arboleda et al; "A multi-agent reinforcement learning approach to obtaining dynamic control policies for stochastic lot scheduling problem, Simulation Modelling Practice and Theory"; vol. 13, Issue 5, Jul. 2005, pp. 389-406, ISSN 1569-190X.

"Self-Optimizing Memory Controllers: A Reinforcement Learning Approach," Engin Ipek, Onur Mutlu, Jose F. Martinez, Rich Caruana (http://csl.cornell.edu/~martinez/doc/isca08.pdf).

"MORSE: Multi-objective Reconfigurable Self-optimizing Memory Scheduler," Janani Mukundan, Jose F. Martinez (http://csl.cornell.edu/~martinez/doc/hpca12.pdf).

* cited by examiner

IMPLEMENTING REINFORCEMENT LEARNING BASED FLASH CONTROL

FIELD OF THE INVENTION

The present invention relates generally to the data processing field, and more particularly, relates to a method and system for implementing enhanced flash storage control using reinforcement learning to provide enhanced performance optimization metrics such as throughput, and endurance.

DESCRIPTION OF THE RELATED ART

Flash storage, such as NAND Flash devices have a complex and large set of command and control decisions to make, and selecting a specific decision can affect performance over a long-term time horizon. Thus, it is computationally hard to make decisions which are optimized over a long-term time horizon. Consequently, most flash controllers use greedy, sub-optimal decision making. Techniques employed by current flash controller scheduling algorithms are static, fixed, myopic policies that cannot learn based on experience by sensing and interacting with the environment or understand and anticipate the long-term consequences of their decisions.

Reinforcement learning (RL) is an online machine learning technique for a system defined by a set of states, a set of possible actions, a set of rules relating state-transitions to actions, and immediate and long-term cumulative rewards. During system operation a RL agent or learner dynamically learns the cumulative reward, also termed Q-values associated with each state, and learns how to act in each state (i.e. which of the possible actions to take) in order to maximize cumulative reward. Reinforcement learning offers a computationally feasible approach to maximizing rewards over long-term horizons in systems with a very large number of parameters. Devising a reinforcement-learning flash controller enables computationally-efficient optimization of flash storage device performance over a long-term horizon.

Reinforcement learning based control approaches have been proposed for uses with dynamic random access memory (DRAM). Flash storage devices have significantly different control and command decisions and characteristics, and, hence, it is not feasible to use DRAM device control approaches in flash storage controllers.

A need exists for an effective mechanism for implementing enhanced flash storage control.

SUMMARY OF THE INVENTION

Principal aspects of the present invention are to provide a method and system for implementing enhanced flash storage control using reinforcement learning to provide enhanced metrics such as throughput, endurance, and latency. Other important aspects of the present invention are to provide such method and system substantially without negative effects and that overcome many of the disadvantages of prior art arrangements.

In brief, a method and system are provided for implementing enhanced flash storage control using reinforcement learning to provide enhanced performance metrics. A flash controller, such as a Reinforcement Learning (RL) flash controller, is coupled to a flash storage. The flash controller employing a feature set including at least one feature responsive to erase operations; computes a current system state responsive to the employed feature set; selects actions at each time step by sensing the computed current system state for performing an action to maximize a long term reward, and moves to another state in the system while obtaining a short-term reward for the performed action.

In accordance with features of the invention, the flash controller defines a feature set of flash parameters determined by a predefined one of a plurality of optimization metrics. The optimization metric is adapted dynamically based upon system workload and system state.

In accordance with features of the invention, the flash controller changes the optimization metric, for example, under bursty write workloads, to write throughput for certain periods of time, with endurance being the optimization metric otherwise.

In accordance with features of the invention, when the optimization metric is changed, the short-term reward function is changed, the state definition may be changed, and the long-term reward tables may be changed or modified or re-initialized by the flash controller.

In accordance with features of the invention, the flash controller associates system states and actions with a long term reward value. At any given state, the flash controller determines if the current optimization metric should change. The flash controller consults a long-term reward table to determine which action maximizes long-term reward in the current state. The flash controller schedules the command estimated to yield the highest long-term reward in each state.

In accordance with features of the invention, the flash controller continuously updates the long term reward values that are associated with states and actions based on feedback from the system that includes at each schedule time-step, updating the long-term reward table for another state after performing the action that provides the highest long term reward value.

In accordance with features of the invention, the flash controller uses a feature selection function to select a subset of features which are pertinent to decision-making from a feature list, removing selected irrelevant or redundant features to increase the efficacy of learning.

In accordance with features of the invention, an estimate of a plurality of reward values $Q(s,a)$ is updated and maintained, for example, kept in a table, with $Q(s,a)$ iteratively approximated based on experience. The long-term reward associated with action a in state s is represented by:

$$Q(s,a) \leftarrow (1-a)Q(s,a) + a(r + gQ(s',a'))$$

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing enhanced flash storage control using reinforcement learning (RL) to provide enhanced performance metrics. Reinforcement learning of the invention provides a non-greedy approach to scheduling wherein the scheduler has the capability of foresight and long-term planning. An RL based learning algorithm of the invention is capable of anticipating long-term consequences of its decision making process; and continuously optimizes and makes scheduling decisions when encountering new unobserved states by using experience that it has gained in previously observed similar system states in the past. Reinforcement learning of the invention is an online learning technique, and has the ability to adapt to workload changes and phase behavior.

Figure 1:
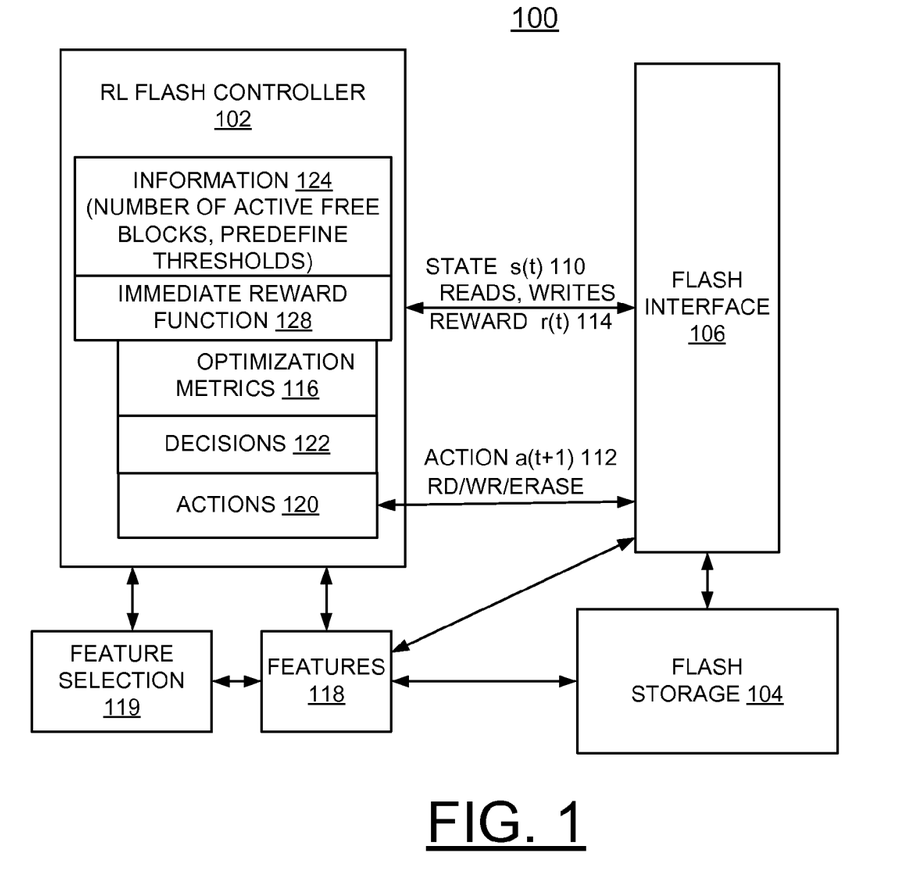
FIG. 1 is a block diagram representation illustrating an example system for implementing flash storage control using reinforcement learning to provide enhanced performance metrics in accordance with the preferred embodiment.

Having reference now to the drawings, in FIG. 1, there is shown an example system generally designated by the reference character 100 for implementing enhanced flash storage control using reinforcement learning to provide enhanced performance metrics in accordance with the preferred embodiment.

Memory system 100 includes a flash controller 102 or a RL flash controller 102 in accordance with the invention and a flash storage 104 connected by a flash interface 106 and one or more busses providing communication paths among the various system components for states s(t) 110, such as reads, writes, sending actions a(t+1) 112, such as read (RD), write (WR), and erase, and rewards r(t) 114, such as +1/0.

Flash storage 104 includes a NAND flash storage devices and/or optionally other flash storage devices or non-volatile storage cells, such as phase change memory (PCM) devices, magnetic RAM (MRAM), and resistive RAM (RRAM, ReRAM).

As illustrated in FIG. 1, RL flash controller 102 in accordance with the invention dynamically learns the cumulative reward r(t) or Q-values 114 associated with each state s(t) 110, and learns how to act in each state or the possible actions a(t+1) 112 to take in order to maximize cumulative reward. RL flash controller 102 is capable of interacting with its environment. At every time step, the RL flash controller 102 is able to sense the current state s(t) 110 of the system 100, perform an action a(t+1) 112 that will maximize a long term goal, and move to another state s(t) 110 in the system while obtaining a reward r(t) 114 for doing so. The flash interface 106, (cores, buses) and the like of the system 100, make up the state s(t) 110. The actions a(t+1) 112 are all the flash commands that can be sent on the bus. Optimization metrics for 116 include performance metrics, such as, throughput, endurance, and a weighted combination of throughput and endurance.

In accordance with features of the invention, RL flash controller 102 is capable of associating system states s(t) 110 and actions a(t+1) 112 with a long term reward value. Then, at any given state s(t) 110, RL flash controller 102 picks the action a(t+1) 112 that provides the highest long term reward value r(t) or Q-values 114. RL flash controller 102 continuously updates these long term reward values r(t) or Q-values 114 that are associated with s(t) 110 and actions a(t+1) 112 based on feedback from the system.

Example operations for implementing memory system 100 are illustrated in FIGS. 2, 3, 4, 5 and 6 in accordance with preferred embodiments including example steps performed by RL flash controller 102. There are many reinforcement learning (RL) algorithms optionally used to implement RL flash controller 102, for example, including SARSA (State-Action-Reward-State-Action), Q-learning, or temporal difference methods, and the like.

As illustrated in FIG. 1, a plurality of features 118 that make up the RL memory system 100 and a feature selection function 119 are provided with the RL flash controller 102 in accordance with the invention. Actions 120 including any possible Flash command sent on the flash bus, Metrics of Optimization 116, Decisions 122 taken by controller 102 at every time step and Information 124 including a number of active free blocks, and predefined thresholds, are provided with the RL flash controller 102 in accordance with the invention.

RL flash controller 102 uses a feature selection function 119 to select a subset of features which are pertinent to decision-making from features 118, such as included in a feature list of Table 1. RL flash controller 102 identifies an immediate reward to be offered for each action. The total reward associated with an action, as well as the long-term reward associated with a state are both functions of the immediate reward. Thus the immediate reward values drive the learner's behavior; hence, it is important that the immediate rewards be aligned with the metric to be optimized.

In accordance with features of the invention, since there are a number of features 118 that make up the RL memory system 100, and since not all of them can be represented in hardware, a feature selection technique in the feature selection 119, such as step-wise greedy selection, Multi-factor selection, or the like, is used to reduce set of features to a number that can be easily represented in hardware and to a set that is capable of adequately capturing and representing the system at hand.

In accordance with features of the invention, the immediate reward function 128 is dependent on the optimization metric 116 and is derived automatically using some effective and extensive search technique like genetic programming search, simulated annealing or hill climbing with random restarts.

In accordance with features of the invention, in an exemplary embodiment, RL flash controller 102 simultaneously determines the immediate reward function 128 and the feature selection 119 in an offline learning phase. For example, an iterative learning procedure is used, in which, alternately, the selected features 119 are fixed and the reward function 128 is learned, and, alternately, the reward function 128 is kept fixed and the selected features 119 are learned. Specifically, in a first step the feature set 119 is kept fixed, and a nonlinear optimization algorithm known in the art such as gradient descent, Newton-Raphson, simulated annealing, genetic programming or the like is used to obtain the reward function which maximizes the optimization metric 116 of interest. In a second step, the reward function is kept fixed, and a known feature selection method, which may include the use of non-linear optimization, is used to obtain the feature set which maximizes the metric of interest. The first and second steps are alternated either for a fixed number of iterations, or until convergence is reached where the metric of interest does not change much from iteration to iteration.

The learned rewards 128 and the selected features 119 are then used by the RL flash controller 102 in the online control of flash storage 104. In an embodiment, multiple sets of reward functions 128 and feature-sets 119 are learned corresponding to varying metrics of interest. The multiple sets of reward functions 128 and feature-sets 119 are then switched between, during controller operation, based on dynamic adaptation to the run-time state.

Memory system 100 is shown in simplified form sufficient for understanding the present invention. The illustrated memory system 100 is not intended to imply architectural or functional limitations. The present invention can be used with various hardware implementations and systems and various other internal hardware devices.

In accordance with features of the invention, the RL flash controller 102 having capability of foresight and long-term planning, performs a non-greedy scheduling algorithm. The RL flash controller 102 enables computationally-efficient optimization of flash storage 104, such as NAND flash device performance over a long-term horizon. Actions 120 are selected at each time step by sensing a current state 110 of the system 100, and an action 120 is performed that will maximize a long term goal, and moving to another state in the system while obtaining a reward 114 for the performed action.

In accordance with features of the invention, the use of the same RL flash controller 102 is enabled in multiple system contexts. For example, depending on the means of connecting the storage device 104 in the system 100, such as IO-attached/PCIe attached; directly attached to the main memory bus; attached to a RAID controller; and the like, there may be different desirable performance characteristics, as well as different stresses placed on the endurance of the drive.

In accordance with features of the invention, the use of the same RL flash controller 102 is enabled for multiple application contexts. For example, depending on the software structure in which the storage device 104 is used, there may be varying performance priority placed on read/write streams, varying randomness in accesses, and the like. Examples include use of the storage device 104 as a tier in the storage hierarchy, use of it for general application data access, use of it as a storage cache, and the like.

In accordance with features of the invention, the RL flash controller 102 is enabled to remain effective during multiple points in the storage device lifetime. Rewards and feature selection may be updated, depending on required performance or endurance priorities, which are determined based on how the storage device is integrated into the system, the application being run, or the remaining lifetime of the drive. In general, when updating rewards and features, the controller actions remain constant, but in some cases, additional actions 120 may be added to the controller's repertoire, in conjunction with a shift in overall system performance priorities or drive lifetime. For example, as the drive ages, the number of pages relocated (action "Page Relocate-xN") may be changed so that N is larger.

Figure 2:
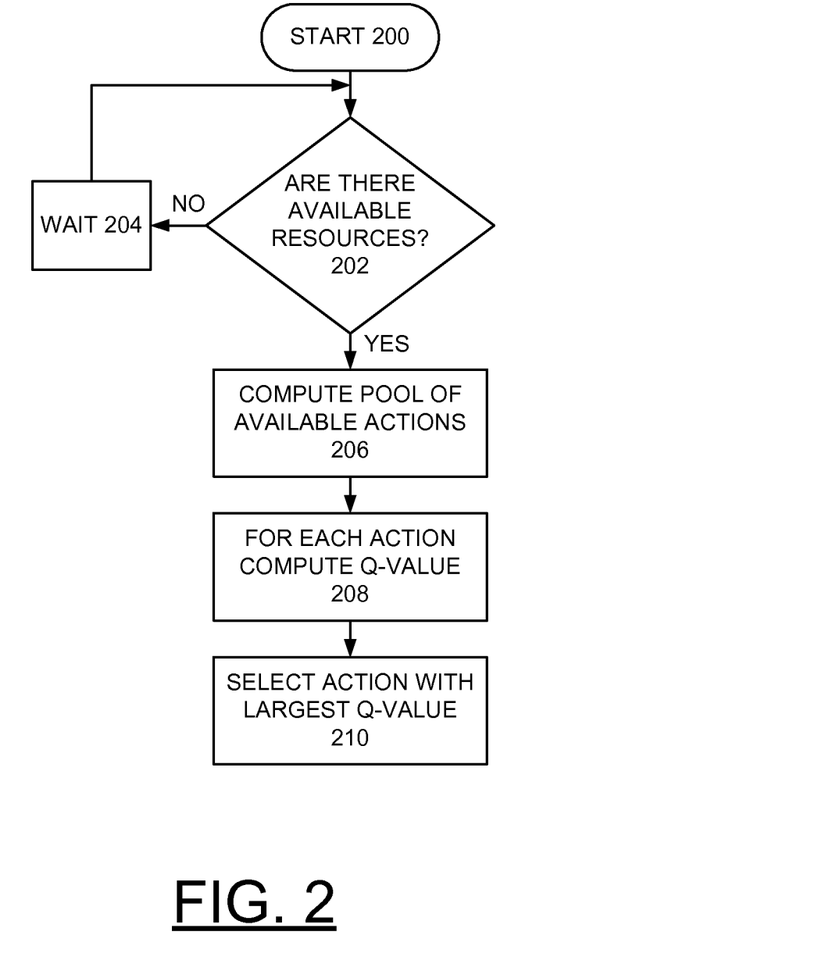
FIG. 2 is a flow chart illustrating example action decision steps performed by the system of FIG. 1 for implementing flash storage control using reinforcement learning in accordance with a preferred embodiment.

Referring to FIG. 2, there are shown example action decision steps performed by RL flash controller 102 in the system 100 starting at a block 200 for implementing flash storage control using reinforcement learning in accordance with a preferred embodiment. Checking for available resources is performed as indicated in a decision block 202. When available resources are not identified, waiting is provided as indicated in a block 204. When available resources are identified, a pool of available actions is computed as indicated in a block 206. For each action, a Q-value is computed as indicated in a block 208. An action with the largest Q-value is selected as indicated in a block 210.

Figure 3:
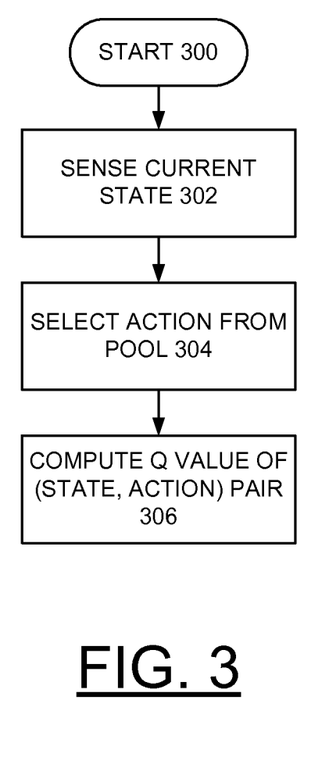
FIG. 3 is a flow chart illustrating example Q-value calculation steps performed by the system of FIG. 1 for implementing flash storage control using reinforcement learning in accordance with a preferred embodiment.

Referring to FIG. 3, there are shown example Q-value calculation steps performed by RL flash controller 102 in the system 100 starting at a block 300 for implementing flash storage control using reinforcement learning in accordance with a preferred embodiment. As indicated in a block 302, a current state is sensed. Next an action is selected from a pool as indicated in a block 304. A Q-value of the state, action pair is computed as indicated in a block 306 completing the Q-value calculation steps.

Figure 4:
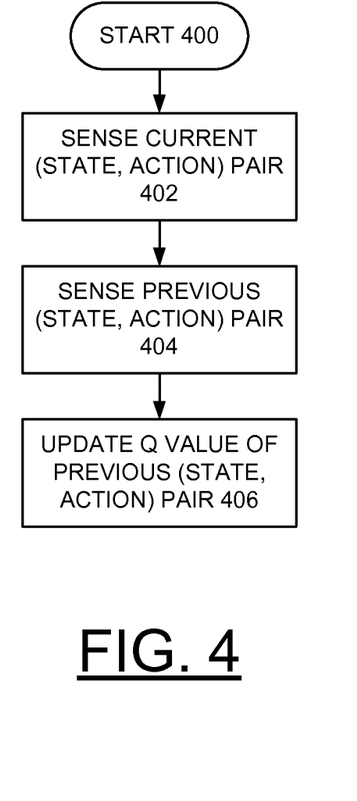
FIG. 4 is a flow chart illustrating example Q-value update steps performed by the system of FIG. 1 for implementing flash storage control using reinforcement learning in accordance with a preferred embodiment.

Referring to FIG. 4, there are shown example Q-value update steps performed by RL flash controller 102 in the system 100 starting at a block 400 for implementing flash storage control using reinforcement learning in accordance with a preferred embodiment. RL flash controller 102 continuously updates the long term reward values that are associated with states and actions based on feedback from the system. A current (state, action) pair is sensed as indicated in a block 402. A previous (state, action) pair is sensed as indicated in a block 404. A Q-value of the previous state, action pair is updated as indicated in a block 306 completing the Q-value update steps.

Figure 5:
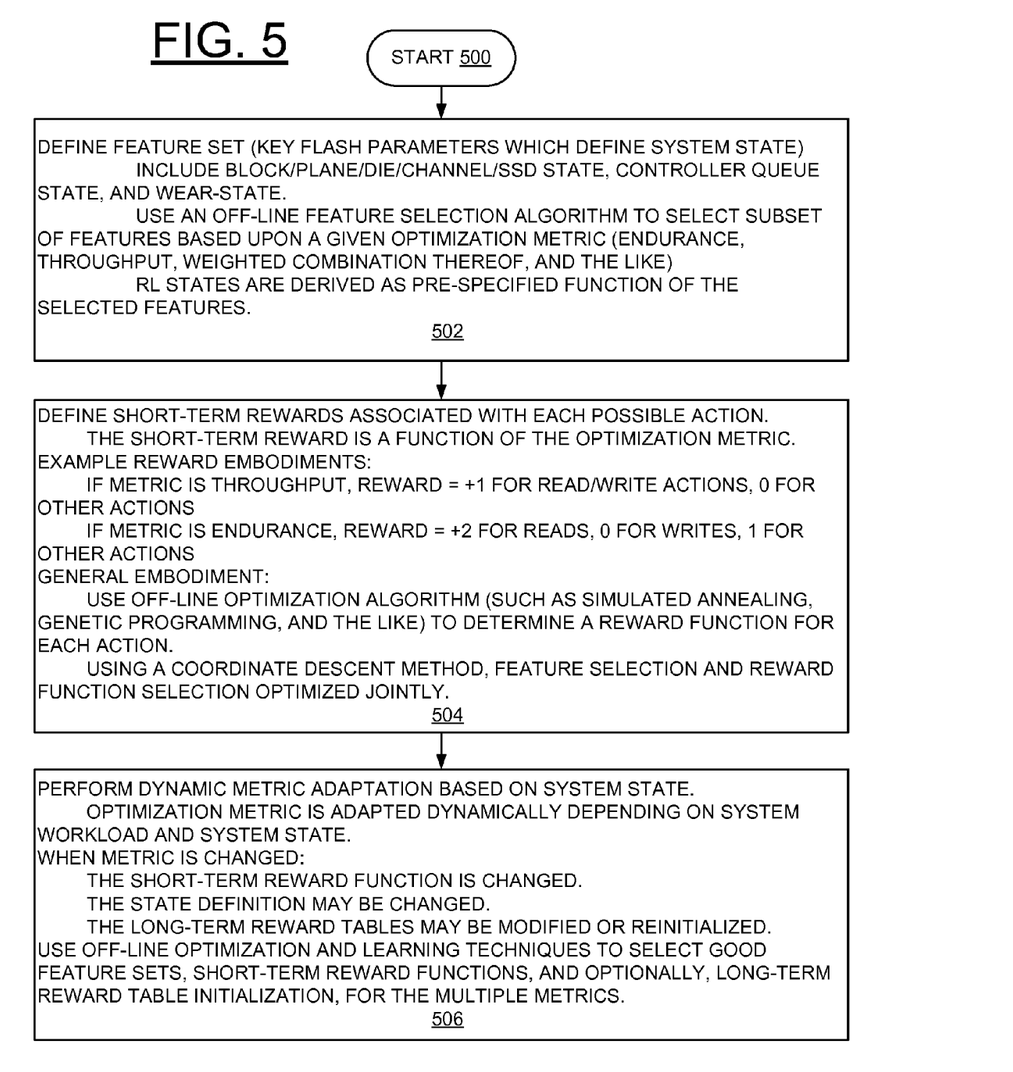
FIGS. 5 and 6 are respective flow charts illustrating example operations for implementing flash storage control using reinforcement learning to provide enhanced performance metrics in accordance with the preferred embodiment.
Figure 6:
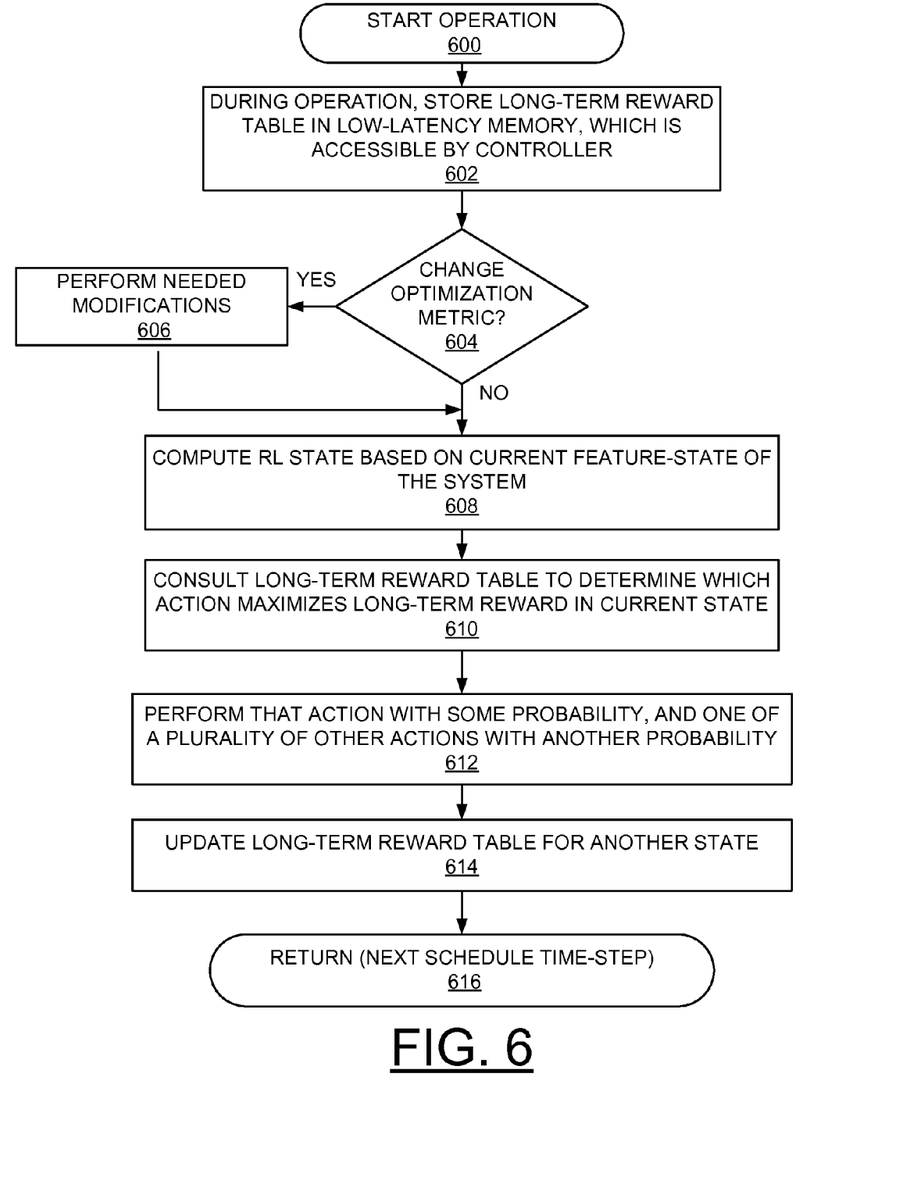

Referring now to FIGS. 5 and 6, there are shown respective flow charts illustrating example operations for implementing flash storage control using reinforcement learning to provide enhanced performance metrics in accordance with the preferred embodiment.

In FIG. 5, an exemplary embodiment of the RL flash controller 112 starts as indicated in a block 500. As indicated in a block 502, a feature set, including key flash parameters which define system state, is defined. As shown, the feature set includes block/plane/die/channel/SSD state, controller queue state, and wear-state. An off-line feature selection algorithm is used to select a subset of features based upon a given optimization metric, such as endurance, throughput, a weighted combination thereof, and the like. RL states are derived as a pre-specified function of the selected features in the defined feature set.

Short-term rewards associated with each possible action are defined as indicated in a block 504. In an embodiment, the short-term reward is a function of the optimization metric. As shown, example reward embodiments include: if the metric is throughput, reward=+1 for read/write actions, and 0 for other actions; and, if the metric is endurance, reward=0 for write actions, +2 for read actions, and 1 for other actions. In a general embodiment of the invention, an off-line optimization algorithm, such as simulated annealing, genetic programming, and the like, is used to determine a reward function for each action. In an embodiment, the feature selection and reward function selection are optimized jointly using a coordinate descent method. Other optimization techniques known in the art can also be used.

As indicated in a block 506, dynamic metric adaptation based on system state is performed. Depending on system workload and system state, the optimization metric is adapted dynamically. For example, under bursty write workloads, write throughput may be the optimization metric of choice for certain periods of time, with endurance being the optimization metric otherwise. When the optimization metric is changed, the short-term reward function is changed, the state definition may be changed, and the long-term reward tables may be modified, or re-initialized. Off-line optimization and learning techniques are used to select good feature sets, short-term reward functions and, optionally, long-term reward table initialization, for the multiple metrics.

Referring now to FIG. 6, an exemplary embodiment of operations of the RL flash controller 112 start as indicated in a block 600. As indicated in a block 602, during operation a long-term reward table is stored in low-latency memory which is accessible by the controller. At each schedule time-step, the controller as indicated in a decision block 604 determines if the optimization metric should be changed. If so, needed modifications are performed as indicated in a block 606. As indicated in a block 608, the controller computes the RL state based on the current feature-state of the system. The controller consults the long-term reward table to determine which action maximizes long-term reward in the current state as indicated in a block 610. Next the controller performs that action with some probability, and one of a plurality of other actions with another probability as indicated in a block 612. Then the controller updates the long-term reward table for another state as indicated in a block 614. Then the controller returns to decision block 604 at a next schedule time-step as indicated in a block 616, and the operations continue.

The following Table 1 provides a List of Features 118, Actions 120, Optimization Metrics 116, Decisions 122 and Miscellaneous Information 124 for the RL flash controller 102.

TABLE 1

FEATURES 118
//garbage collection 118
  WRITE_AMP_FACTOR
  // page features 118
  PAGE_LAST_USED
  PAGE_LAST_WRITTEN
  PAGE_LAST_READ
  NUM_TIMES_PAGE_READ
  NUM_TIMES_PAGE_WRITTEN
  AGE_OF_PAGE
  // block features 118
  VALID_PAGES_IN_BLOCK
  INVALID_PAGES_IN_BLOCK
  FREE_PAGES_IN_BLOCK
  AGE_OF_BLOCK
  BLOCK_LAST_USED
  BLOCK_LAST_READ
  BLOCK_LAST_ERASED
  BLOCK_LAST_WRITTEN
  NUM_TIMES_BLOCK_READ
  NUM_TIMES_BLOCK_ERASED
  NUM_TIMES_BLOCK_WRITTEN
  // plane features 118
  ACTIVE_BLOCKS_IN_PLANE
  FREE_BLOCKS_IN_PLANE
  ACTIVE_FREE_BLOCKS_IN_PLANE
  INACTIVE_BLOCKS_IN_PLANE
  PLANE_LAST_USED
  PLANE_LAST_READ
  PLANE_LAS T_ERASED
  PLANE_LAST_WRITTEN
  NUM_TIMES_PLANE_READ
  NUM_TIMES_PLANE_ERASED
  NUM_TIMES_PLANE_WRITTEN TABLE 1-continued // die features 118
  ACTIVE_BLOCKS_IN_DIE
  FREE_BLOCKS_IN_DIE
  ACTIVE_FREE_BLOCKS_IN_DIE
  INACTIVE_BLOCKS_IN_DIE
  DIE_LAST_USED
  DIE_LAST_READ
  DIE_LAST_ERASED
  DIE_LAST_WRITTEN
  NUM_TIMES_DIE_READ
  NUM_TIMES_DIE_ERASED
  NUM_TIMES_DIE_WRITTEN
// Package features 118 (intended primarily to manage power/thermal)
  TOT_POWER_TO_PACKAGE
  VIO_CURRENT_TO_PACKAGE
  VDD_CURRENT_TO_PACKAGE
  TEMPERATURE_OF_PACKAGE
  NUM_ACTIVE_DIES_IN_PACKAGE
  NUM_ACTIVE_CHANNELS_IN_PACKAGE
  NUM_ERASES_TO_PACKAGE
  NUM_PROGRAMS_TO_PACKAGE
  NUM_WRITES_TO_PACKAGE
  // channel features 118
  ACTIVE_BLOCKS_IN_CHANNEL
  FREE_BLOCKS_IN_CHANNEL
  ACTIVE_FREE_BLOCKS_IN_CHANNEL
  INACTIVE_BLOCKS_IN_CHANNEL
  CHANNEL_LAST_USED
  CHANNEL_LAST_READ
  CHANNEL_LAST_ERASED
  CHANNEL_LAST_WRITTEN
  NUM_TIMES_CHANNEL_READ
  NUM_TIMES_CHANNEL_ERASED
  NUM_TIMES_CHANNEL_WRITTEN
  // event features 118
REQUEST_TYPE = 50
  REQUEST_AGE = 51,
  REQUEST_SIZE = 52,
  REQUEST_POSITION = 53,
  //NUM_PAGES_COMPLETED_FOR_REQUEST,
  //NUM_PAGES_NOT_COMPLETED_FOR_REQUEST,
  //NUM_PAGES_IN_SAME_DIE_FOR_REQUES T,
  //NUM_PAGES_IN_DIFFERENT_DIE_FOR_REQUEST,
  //NUM_PAGES_IN_SAME_CHANNEL_FOR_REQUES T,
  //NUM_PAGES_IN_DIFFERENT_CHANNEL_FOR_REQUEST,
  // queue features 118
  READS_IN_QUEUE
  WRITES_IN_ QUEUE
  RWS_IN_QUEUE
  ERASES_IN_QUEUE
  READS_IN_QUEUE_FOR_BLOCK
  READS_IN_ QUEUE_FOR_PLANE
READS_IN_ QUEUE_FOR_DIE
READS_IN_QUEUE_FOR_PACKAGE
  READS_IN_ QUEUE_FOR_CHANNEL
  // SSD features 118
  NUMBER_OF_FREE_BLOCKS
  NUMBER_OF_ACTIVE_BLOCKS
  NUMBER_OF_ACTIVE_FREE_BLOCKS
  NUMBER_OF_INACTIVE_BLOCKS
//Garbage Collection features 118
  BLOCK_LAST_INACTIVE
  NUM_BLOCKS_BEING_COLLECTED_SSD
  NUM_BLOCKS_BEING_COLLECTED_PLANE
  LAST_GC_TIME_SSD
  LAST_GC_TIME_BLOCK
  LAST_GC_TIME_PLANE
//Wear features 118 (either error rate or number of writes)
  WEAR_DISTRIBUTION_IN_PLANE = 66,
  WEAR_DISTRIBUTION_IN_DIE = 67,
  WEAR_DISTRIBUTION_IN_CHANNEL = 69,
  WEAR_DISTRIBUTION_IN_FRU
// DISTRIBUTION → MIN, MAX, MEAN, VARIANCE, STDEV,, etc.
// Features 118 related to signal processing
  NUM_READ_RETRIES_ON_PAGE
  NUM_READ_RETRIES_ON_BLOCK
  NUM_ECC_FAILS_ON_BLOCK
  NUM_ECC_FAILS_ON_PAGE
  LEVEL_OF_ECC_ON_BLOCK
  LEVEL_OF_ECC_ON_PAGE TABLE 1-continued

```
//Hot Cold Data Identification
TIME_STAMP_LOGICAL_PAGE
LRU_LOGICAL_PAGE
FREQUENCY_OF_USE_LOGICAL_PAGE
            Actions 120
Read
Write
Block Erase
Page Relocate-x1-Rd
Page Relocate-x1-Wr
Page Relocate-xN-Rd
Page Relocate-xN-Wr
Copy
Merge
Trim
Other Flash Command sent on the flash Bus
        Metrics of Optimization 116
Performance (cycles to complete a trace)
Read Latency
Write Latency
Bandwidth
Write Amplification
Wear (Endurance)
        Decisions 122 (taken by the controller 102 at every time
step)
Reads : which read command and when to issue
Writes: which write command and when to issue
        where to issue
Block Erase:which erase command and when to issue
Page Relocate-x1:
    which block
    which Page
    when to issue
Page Relocate-xn:
    which block
    how many Pages
    which Pages
    when to issue
            //Information 124 (Miscellaneous)
Number of active free blocks to look at
Threshold for garbage collection
Threshold for block erase
```

Figure 7:
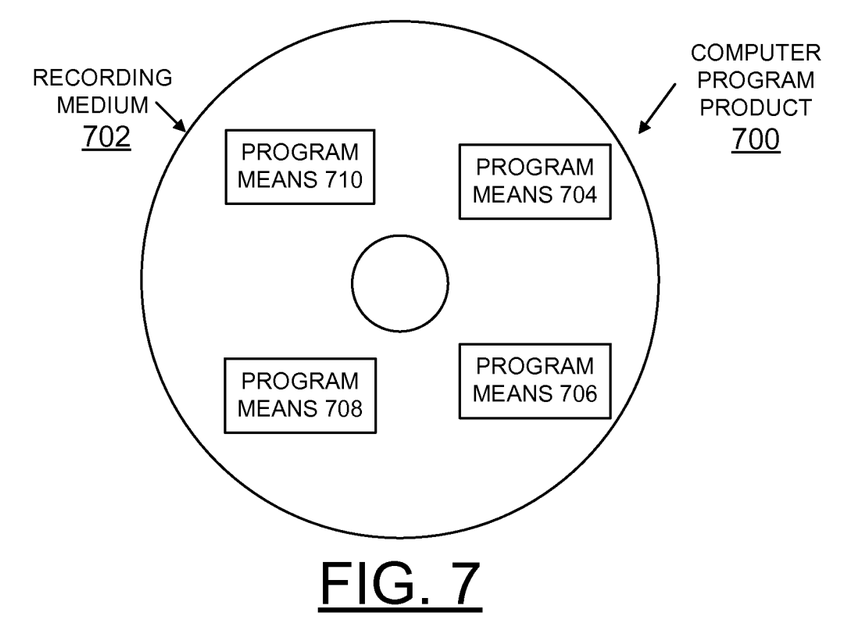
FIG. 7 is a block diagram illustrating a computer program product in accordance with the preferred embodiment.

Referring now to FIG. 7, an article of manufacture or a computer program product 700 of the invention is illustrated. The computer program product 700 is tangibly embodied on a non-transitory computer readable storage medium that includes a recording medium 702, such as, a floppy disk, a high capacity read only memory in the form of an optically read compact disk or CD-ROM, a tape, a non-volatile memory chip, such as a NAND or NOR flash, or another similar computer program product. Recording medium 702 stores program means 704, 706, 708, and 710 on the medium 702 for carrying out the methods for implementing enhanced flash storage control using reinforcement learning to provide enhanced performance metrics of the preferred embodiment in the system 100 of FIG. 1.

A sequence of program instructions or a logical assembly of one or more interrelated modules defined by the recorded program means 704, 706, 708, and 710, direct the system 100 for implementing enhanced flash storage control of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced flash storage control in a flash storage system comprising:
providing a flash storage;
providing flash controller coupled to said flash storage;
said flash controller performing the steps including:
employing a feature set including at least one feature responsive to erase operations; computing a current system state responsive to the employed feature set; selecting actions at each time step by sensing the computed current system state for performing an action to maximize a long term reward, and moving to another state in the system while obtaining a short-term reward for the performed action; and
determining the employed feature set responsive to the selection of one of a plurality of optimization metrics; and
said flash controller changing the optimization metric to write throughput for certain periods of time under bursty write workloads, with endurance being the optimization metric otherwise.

2. The method as recited in claim 1, wherein the selected optimization metric is dynamically adapted based upon system workload and system state.

3. The method as recited in claim 1, wherein the short-term reward is dynamically selected, responsive to the selected optimization metric.

4. The method as recited in claim 1, wherein computing the current system state is responsive to the employed feature set and the dynamically selected optimization metric.

5. The method as recited in claim 1, wherein said flash controller associates system states and actions with a long term reward value; and said flash controller at any given state, computes a state based on a current feature-state of the flash storage, said flash controller consults a long-term reward table to determine which action maximizes said long-term reward in the current feature-state.

6. The method as recited in claim 5, wherein said flash controller dynamically changes the optimization metric of said plurality of optimization metrics based upon system workload and system state, and responsive to changing the optimization metric, said flash controller changes or initializes a long-term reward table storing long-term reward values.

7. The method as recited in claim 1, wherein said flash controller selecting actions includes selecting actions from a list of predefined actions, said predefined actions include performing read operation, performing write operation, performing erase operation, and performing garbage collection operation.

8. The method as recited in claim 1, wherein said flash controller selecting actions includes selecting actions responsive to rewards associated with each action and rewards of past selected actions, the rewards identified responsive to said employed feature set.

9. The method as recited in claim 1, includes said flash controller selecting features in said feature set and said rewards associated with each action being a function of said selected features in said defined selected feature set; and said function for optimizing a performance metric.

10. A system for implementing enhanced flash storage control comprising:
a flash storage;
a flash controller coupled to said flash storage;
said flash controller employing a feature set including at least one feature responsive to erase operations;
said flash controller computing a current system state responsive to the employed feature set;
said flash controller selecting actions at each time step by sensing the computed current system state for performing an action to maximize a long term reward, and moving to another state in the system while obtaining a short-term reward for the performed action;

said flash controller determining the employed feature set responsive to the selection of one of a plurality of optimization metrics; and said flash controller changing the optimization metric to write throughput for certain periods of time under bursty write workloads, with endurance being the optimization metric otherwise.

11. The system as recited in claim 10, wherein said flash controller dynamically selects the short-term reward, responsive to the selected optimization metric.

12. The system as recited in claim 10, includes said flash controller dynamically adapting said optimization metric based upon system workload and system state.

13. The system as recited in claim 12, wherein said flash controller computing the current system state responsive to the employed feature set includes said flash controller computing the current system state, responsive to the employed feature set and the dynamically selected optimization metric.

14. The system as recited in claim 10, wherein said flash controller selecting actions includes said flash controller selecting actions from a list of predefined actions, said predefined actions including perform read, perform write, perform erase operation, and perform garbage collection.

15. The system as recited in claim 10, wherein said flash controller associates system states and actions with a long term reward value; and said flash controller at any given state, computes a state based on a current feature-state of the flash storage, said flash controller consults a long-term reward table to determine which action maximizes said long-term reward in the current feature-state.

16. The system as recited in claim 10, wherein said flash controller dynamically adapting said optimization metric based upon system workload and system state includes said flash controller changing a long-term reward table storing long-term reward values.

* * * * *